April 1, 1958 — A. J. KASAK — 2,829,227
HEATING DEVICE
Filed Dec. 12, 1955 — 2 Sheets-Sheet 1

INVENTOR.
ANTONIN J. KASAK
BY H. O. Clayton
ATTORNEY

April 1, 1958     A. J. KASAK     2,829,227
HEATING DEVICE
Filed Dec. 12, 1955     2 Sheets-Sheet 2
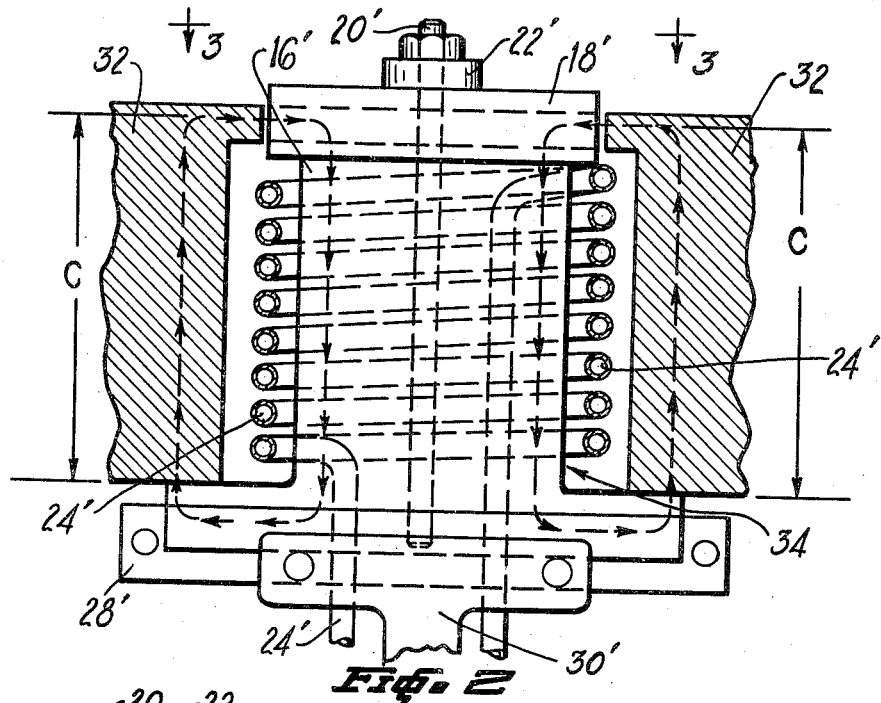
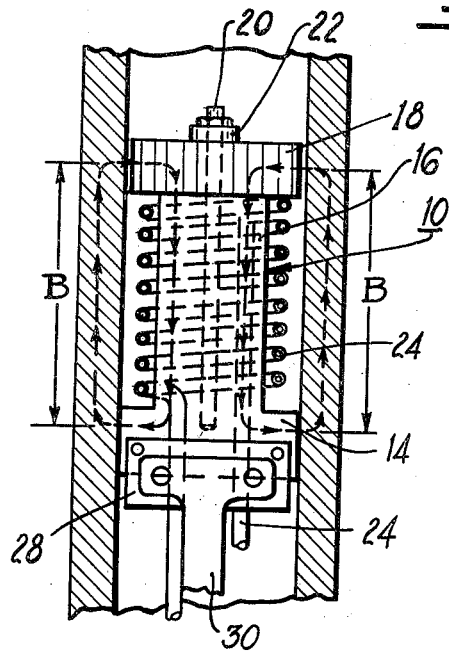
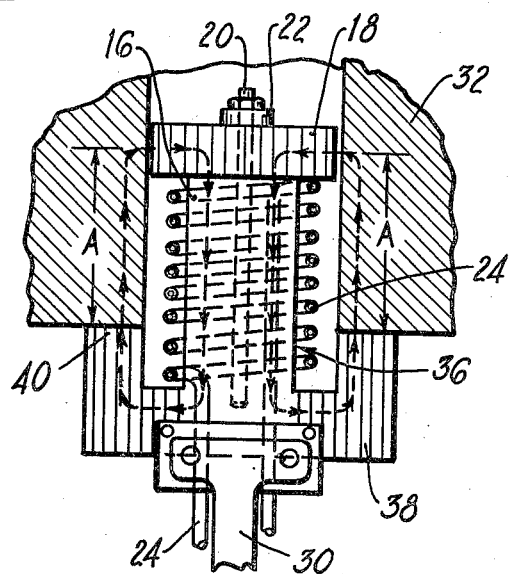
INVENTOR.
ANTONIN J. KASAK
BY
H. O. Clayton
ATTORNEY United States Patent Office 2,829,227
Patented Apr. 1, 1958

2,829,227

HEATING DEVICE

Antonin J. Kasak, South Bend, Ind., assignor to Bendix Aviation Corporation, South Bend, Ind., a corporation of Delaware Application December 12, 1955, Serial No. 552,422

2 Claims. (Cl. 219—10.43)

This invention relates in general to a heating device and in particular to an electrical induction heating device adapted to heat certain areas of metallic materials, preferably of the ferro-magnetic type.

It is an object of my invention to improve upon currently used devices of this type by appreciably reducing the period of time required to heat a certain area of the work to be treated and to provide a relatively simple and easily serviced device to heat treat certain areas of differently shaped pieces of work. For example, the induction heating unit constituting the principal feature of my invention may serve to heat a certain area of the surface of a trunnion to be used as part of the shock strut mechanism of an airplane.

An important object of my invention is to provide a compact induction heating unit of very few parts said unit serving to very quickly heat a certain limited area of a ferro-magnetic work piece it being impractical, with many induction heaters of the prior art, to pinpoint, that is localize the area of the work to be treated; in other words, limit the area heated to one of relatively small volume. With my invention the heating can be quickly accomplished with a relatively low A. C. current such as a 60 cycle A. C. current; and the heating can be confined to the desired area to be heated.

A further object of my invention is to provide an induction type heater unit readily adapted to heat a rather small portion of the internal surface of the work piece being treated.

Yet another object of my invention is to provide a simple yet effective mechanism for first using the induction heater unit of my invention to heat a certain element and then assemble said element with a cold element to provide the desired combination.

Other objects of the invention and desirable details of construction of parts will become apparent from the following detailed description of certain illustrative embodiments of the invention, taken in conjunction with the accompanying drawings illustrating said embodiments, in which:

Figure 3 is a view, taken on the line 3—3 of Figure 2, disclosing details of the heater unit of Figure 2;

Figure 1:
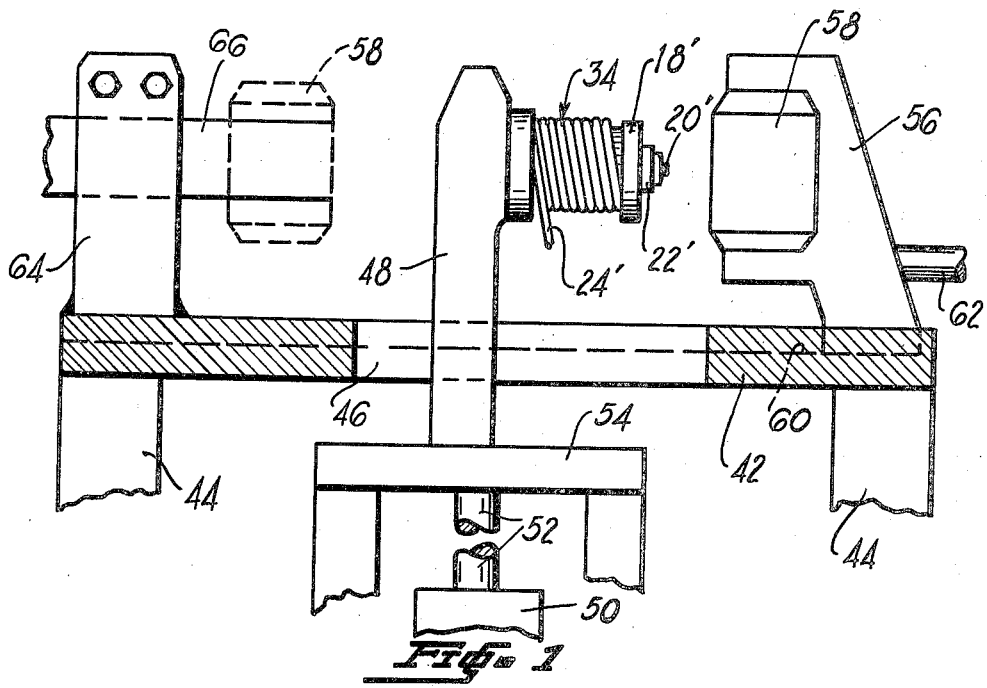
Figure 1 is a side elevational view of the work treating and assembly mechanism of my invention.

Figure 4 discloses an embodiment of the induction heater of my invention when used to heat a portion of a cylindrically shaped work piece; and Figure 5 discloses another embodiment of the induction heater unit of my invention said unit serving to heat a portion of the material outlining an opening in a work piece.

There is disclosed in Figure 4 one embodiment of the induction heater unit of my invention wherein said unit, indicated by the reference numeral 10, is employed to heat a portion of the inner surface of a tube member 12. This unit 10 includes a generally T-shaped core member comprising a prism shaped base portion 14 and a prism shaped portion 16 extending therefrom and preferably integral therewith. A generally prism shaped armature member 18 is mounted on the end of the member 16; and the latter member and the attached base portion 14 are secured to the armature member by two spaced apart non-magnetic bolts 20 which extend through a prism shaped plate 22. Similar to the embodiment of my invention shown in Figures 2 and 3, this plate 22 of Figure 4 is rectangular in outline and the two bolts straddle the member 16 and are threaded at their lower ends into the base portion 14. The portions 14 and 16 and the armature 18 are laminated in construction; and said laminations are preferably of a material such as silicon steel and, as disclosed in Figure 4, extend in planes parallel to the longitudinal axis of the heater unit. Preferably the laminations are held together by a tape, Figure 3, of fibre glass or other suitable material.

A multiturn work coil 24 of my induction heater unit is sleeved over the laminated portion 16 before the armature 18 is secured in place; and this coil, preferably of copper tubing 24, is encased in a fibre glass loom, not shown. Water under pressure is fed into and from the tube 24 by any suitable means. The coil is interposed between the armature and the portion 14 of the core. A plate 28 is secured to the member 14 and to this plate there is secured a handle member 30. There is thus provided, by the handle member, means for moving the heater units 14, 16, 18, 22, 24 to and from the desired position within the tube 12, that is a position in close proximity with the particular area of the tube to be heat treated. In Figure 4 the work area heated is indicated by the letter B and the magnetic field areas are indicated by arrows outlining the paths of said fields.

Figure 2:
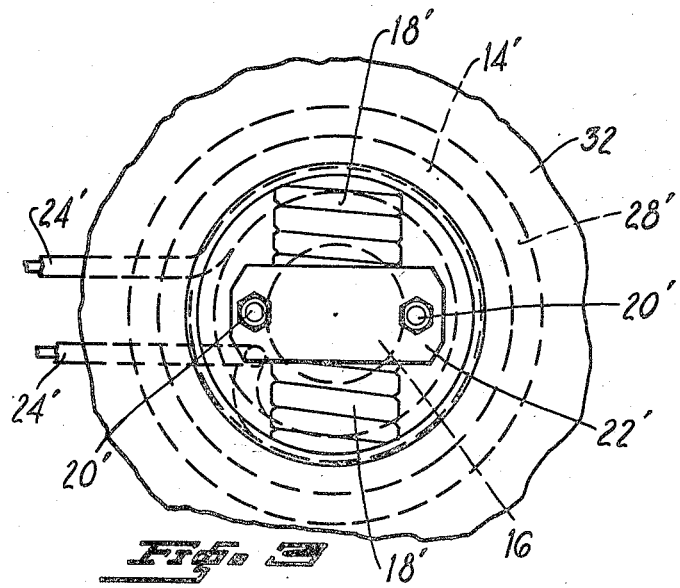
Figure 2 is a side view of one embodiment of the induction heater unit of my invention said unit serving to heat that portion of a work piece outlining an opening therein.

There is disclosed in Figures 2 and 3 a preferred embodiment of my invention adapted to heat that portion of a piece of work 32 which outlines an opening in said work. This particular piece of work may be a trunnion. The heater unit of these figures is indicated by the reference numeral 34 and duplicates the unit 10 of Figure 4 save for the size of the armature and base portion; accordingly, the reference numerals of Figure 4 are applied to the corresponding parts in the embodiment disclosed in Figures 2 and 3 with a prime added. The work area heated in said embodiment is indicated by the letter C; and the magnetic field path is outlined by arrows.

There is disclosed in Figure 5 another embodiment of my induction heater unit; and this embodiment, indicated by the reference numeral 36, duplicates the embodiment of Figure 2 save for the shape of the base portion of the unit. Now this base portion, indicated by the reference numeral 38, constitutes an important feature of my invention inasmuch as said portion includes a flange 40 which flange is laminated and acts as a magnetic path only to limit the heated area as desired. The flange 40, as will be described hereinafter, shortens the heated area of the work, said area in Figure 5 being indicated by the letter A.

Describing now the operation of the induction heater units of Figures 2 to 5 inclusive, with a passage of A. C. electrical current through the work coil there is set up the magnetic fields indicated by the paths of the arrows in said figures; and the magnetic flux density of said fields is controlled in large part by the presence of the cores 14, 16 and the intensity of the current passing through the coil 24.

The primary current flowing through the coil is preferably of relatively low frequency, say 60 cycles; and the voltage is stepped down to five 5 to 40 volts producing current of say 100 to 600 amperes. The primary current, by virtue of the magnetic fields, induces secondary eddy currents in the areas of the work indicated by the letters A, B and C in the drawings; and the eddy currents of course result in a heating of said areas. The eddy, that is secondary, current induced in the area bounded by the coil, and the consequent heating of the parts within said area is reduced to a minimum by virtue of the laminated construction of the base portion 14, portion 16 and the armature of the heater unit. Outside the coil the current induced in the work, and consequent heated area of said work, is localized by the shape and constitution of the parts of the heating unit. For example, the flange 40 of Figure 5, by virtue of its shape and particular laminated structure, limits the area heated to that area opposite that portion of the coil which is not surrounded by said flange. If the work piece is ferro-magnetic in character the depth to which the induced current penetrates said work is influenced by its magnetic permeability, the intensity of the magnetic field, the resistivity of the material of the work, and the frequency of the current. If the work material is non-magnetic such as an aluminum alloy, the depth of penetration depends only upon the frequency and the resistivity of the work. The so-called R. I. square heating effect of the work coil is neutralized by the water coolant flowing through the conductor 24 constituting the coil.

There is thus provided a simple, easily serviced induction heating unit readily adapted for the rapid and controlled heating of the desired area of the interior of devices such as trunnions and tubes of different sizes and diameters; or my heating unit may be used for other purposes such as the joining of certain parts by fusion. Most metal pieces can be heated more quickly inductively than by any other method. The heating by my invention, by virtue of either varying the diameter and thickness of the base portion 14 or varying the depth of the flange 40 on said portion, can be confined to the desired area, which area may be but a small fraction of the total area of the work; and with the use of my heating unit the heating operation starts instantly when the current is applied to the work coil and stops instantly when said current is stopped. The use of the flanged core member of Figure 5 makes it possible to shorten the heated area of the work without changing the length of the coil.

There is disclosed in Figure 1 a mechanism for utilizing the heating unit 34 of Figure 2 with the handle 30 removed therefrom. Describing this mechanism, a table 42 supported by standards 44 is provided with an opening 46 to receive a post 48 which has mounted on its upper end the induction heater unit 34. The power element, not shown, of a fixedly mounted double acting pressure differential operated motor 50 is connected to a rod 52 which is connected at its upper end to a support 54; and the post 48 is fixedly connected to this support. A bracket 56, serving as a mounting for a trunnion work piece 58, is slidably mounted in a recess 60 in the table 42; and said bracket, with the trunnion mounted thereon, is moved toward and away from the heating unit 34 by means of a rod 62. On one end of the table 42 there is fixedly mounted a post 64 bored to receive a piece of work 66 such as a tubular member.

Describing now the operation of the mechanism of Figure 1, the heater unit 34 is mounted on the post 48 and work pieces 58 and 66 are mounted in place in the bracket 56 and post 64, respectively. The bracket 56, with the trunnion mounted therein, is then moved to the left, Figure 1, thereby positioning the heater unit within the trunnion. The heater unit is then energized for a relatively short period of time to heat the interior of the trunnion whereupon the bracket with its trunnion is moved to the right as a unit and the motor 50 energized to lower the post 48 and move the unit 34 out of alignment with the trunnion 58 and work piece 66. The bracket 56 is then moved to the left to sleeve the heated trunnion over the end of the member 66. There is then a waiting period to enable the trunnion, by its cooling operation, to contract thereby effecting a tight or shrinking fit with the member 66 to complete the assembly of the parts of the work; and after this operation is effected the bracket 56 is moved to the right preparatory to effect another operation of the mechanism.

While several embodiments of the invention have been described in considerable detail, I do not wish to be limited to the particular constructions shown which may be varied within the scope of the invention, and it is the intention to cover hereby all adaptations, modifications and arrangements thereof which come within the practice of those skilled in the art to which the invention relates.

I claim:

1. An elecrical induction heater unit adapted to be inserted within an opening in a work piece and when so positioned to heat a limited portion of the material of said work piece outlining said opening, said unit including a generally T-shaped core member comprising a base portion having a flange member extending therefrom the outer periphery of said flange member being adapted to contact the edge of the area of the work piece to be heated, an armature detachably mounted on one end of said core member, an electric current conducting coil surrounding a portion of the core member, and a handle means secured to the core member and operable to move said member to the desired position.

2. An electrical induction heater unit including a laminated core member having a base portion which may be varied in shape to thereby control the work area to be heated, a laminated armature member mounted on the core member, means for detachably securing the armature to the core member, and a work coil sleeved over a portion of the core member.

References Cited in the file of this patent

UNITED STATES PATENTS

| | | |
|---|---|---|
| 735,581 | Pollacsek et al. | Aug. 4, 1904 |
| 1,268,468 | Jacobson | June 4, 1918 |
| 2,378,870 | Abe et al. | June 26, 1945 |
| 2,752,470 | Redmond | June 26, 1956 |